United States Patent Office 3,331,837
Patented July 18, 1967

3,331,837
α,β-UNSATURATED γ-LACTONE COMPOUNDS AND PROCESS FOR THE PRODUCTION OF SAME
Hans-Günter Lehmann, Berlin, Germany, assignor to Schering Aktiengesellschaft, Berlin, Germany
No Drawing. Filed Oct. 30, 1964, Ser. No. 407,862
18 Claims. (Cl. 260—239.57)

This invention relates to the preparation and use of γ-lactones having the formula

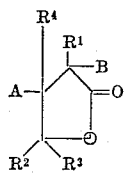

wherein A is hydroxyl and B is hydrogen or A and B together represent a C—C bond, $R^1$ is hydrogen or possibly a substituted or not substituted hydrocarbon group and $R^2$, $R^3$ and $R^4$ are either individual substituted or not substituted hydrocarbon groups or jointly members of alicyclic ring systems.

A broad object of the invention is to provide a new method of making γ-lactones from carboxylic acid esters of tertiary α-hydroxy ketones.

A narrower but more particular object is to provide γ-lactones of α-acyloxyketo steroids and the methods of preparation.

Another object is to provide various processes for the synthesis of the steroids of this invention, and to provide novel intermediates therefor.

Other objects of this invention are to provide γ-lactones having antibacterial effects and γ-lactones having antibiotic effects.

These new compounds in admixture with the usual excipients and carriers can be used for the treatment of mammals. Any of the conventional carriers can be used, such as water, oils, polyethyleneglycols, gelatine, lactose, starch, magnesium stearate, talcum, petroleum jelly and cholesterol.

The γ-lactones of this invention exhibit antibacterial and antibiotic effects as disclosed by W. A. Sexton, Chemische Konstitution und biologische Wirkung, pp. 216–217.

The method of this invention contemplates reacting (a) carboxylic acid esters of tertiary α-hydroxy ketones where the acid components contain a $CH_2$ group in α-position to the carboxyl ester group with (b) strong proton acceptors in (c) water-free dipolar aprotic solvents. The reaction proceeds as follows:

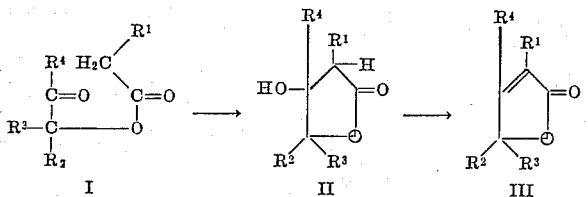

Suitable aprotic solvents are disclosed by J. Miller and A. J. Parker, in the Journal of the American Chemical Society, vol. 83 (1961), p. 117. Examples of such aprotic solvents are dimethyl sulfoxide, dimethyl formamide, dimethylacetamide, N-methyl-α-pyrrolidone, tetramethylene sulfoxide, and tetramethylene sulfone.

Suitable proton acceptors for this reaction are metal hydrides, especially alkali metal hydrides such as sodium hydride, alkali metal amides, preferably sodium amide, alkali metal alcoholates such as sodium methylate, alkali or alkaline earth metal hydroxides such as sodium hydroxide and sodium metal.

Typical esters of tertiary α-hydroxy ketones having a $CH_2$ group in α-position to the carboxyl group are:

$\Delta^5$-pregnene-3β,17α-diol-20-one-17-caproate,
21-desoxyprednisolone-dipropionate,
21-desoxyprednisone-acetate,
21-desoxyprednisone-propionate,
5α-pregnane-3β,17α-diol-20-one-17-acetate,
5α-pregnane-3β,17α-diol-20-one-17-propionate,
5β-pregnane-3α,17α-diol-20-one-17-acetate,
5β-pregnane-3α,17α-diol-20-one-17-propionate,
5α-pregnane-17α-ol-3-20-dione-propionate,
diphenyl-benzoyl-methyl-propionate,
methyl-ethyl-acetyl-methyl-propionate.

The method of this invention produces the α,β-unsaturated γ-lactone III in a two-stage process as shown above. The first stage is an intramolecular condensation (similar to an aldol condensation) between the keto group and the $CH_2$ group in the α-position to the carboxylic acid ester group of the starting material I. In the first stage β-hydroxy γ-lactone II is produced and then is converted into the α,β-unsaturated γ-lactone by removal of the β-hydroxyl group.

By suitable variation of the external conditions, and especially by shortening the reaction time and by the use of alkali- and alkaline earth hydroxides as proton acceptors, the process of this invention can be performed in such a manner that the β-hydroxy-γ-lactone II is isolated as the principal product.

The process of this invention is chemically unique. The course of the reaction is surprising because the expected result would be a saponification of the ester group rather than lactone formation.

Of especially practical significance is the fact that the new process is applicable to α-acyloxyketo-steroids and is not in any manner affected by the presence of other hydroxyl groups in the steroid structure, as shown by the following example:

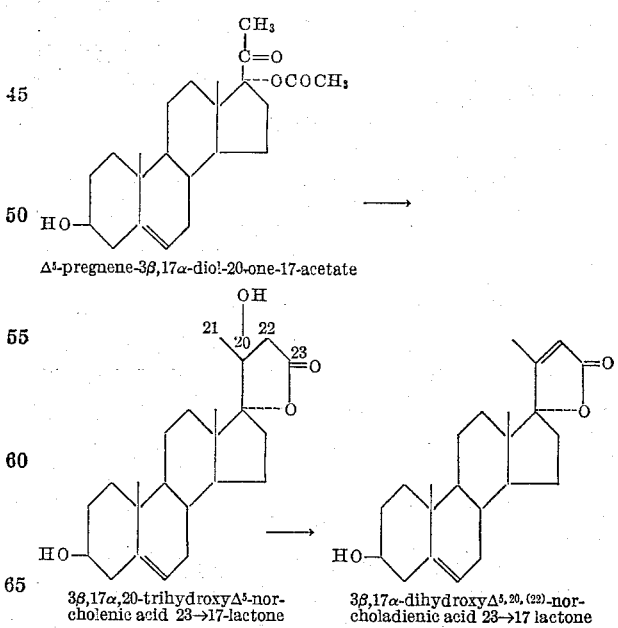

$\Delta^5$-pregnene-3β,17α-diol-20-one-17-acetate

3β,17α,20-trihydroxy$\Delta^5$-norcholenic acid 23→17-lactone

3β,17α-dihydroxy$\Delta^{5,20,(22)}$-norcholadienic acid 23→17 lactone

Typical reactions of the prior art preparation of steroids and the raw materials are disclosed by Kirk and Othmer, Encyclopedia of Chemical Technology, vol. 3, pp. 213–215 (1949), and vol. 12, pp. 917–947 (1954). The production of the particular raw material $\Delta^5$- pregnene-3β,17α-diol-20-one-17-acetate is disclosed in H. J. Ringold, G. Rosenkranz, F. Sondheimer, J. Am. Chem. Soc., 78, 820 (1956), and U.S. Patent 2,805,230 (1957).

Without further elaboration, it is believed that one skilled in the art can produce the novel compounds of this invention by reference to the preceding description. The following preferred specific embodiments of the process are, therefore, merely exemplary and not to be considered limitative of the invention in any way whatsoever.

Example 1

60 ml. dimethyl sulfoxide are reacted under nitrogen 5 hours at room temperature with 480 mg. sodium hydride and 3.75 g. $\Delta^5$-pregnene-3β,17α-diol-20-one-17-acetate with stirring. The mixture is then poured into water acidified with acetic acid, filtered, washed with water, and dried. The yield is 3.5 g. crude 3β,17α-dihydroxy-$\Delta^{5,20,(22)}$-nor choladienic-acid-23→17-lactone. M.P. 247–253° C. For analysis it is recrystallized from ethyl acetate. M.P. 257–259° C.

Example 2

10 ml. dimethylsulfoxide are reacted under nitrogen with 142 mg. sodium hydride and with 1 g. 5α-pregnane-17α-ol-3,20-dione-acetate 5 hours at room temperature under nitrogen with stirring. The product is worked up as in Example 1, chromatographed on silica gel and recrystallized from ethyl acetate. The yield is 0.26 g. 17α-hydroxy - 3 - oxo-$\Delta^{22,(22)}$-nor-5α-chlolenic-acid-23→17-lactone. M.P. 233–234° C.

Example 3

10 ml. dimethylformamide are reacted under nitrogen with 355 mg. $\Delta^5$ - pregnene-3β,17α-diol-20-one-17-acetate and 31 mg. sodium hydride 5 hours at room temperature with stirring. The mixture is then poured into ice water acidified with acetic acid, filtered, washed with water, and dried. The yield is 72% crude 3β,17α-dihydroxy-$\Delta^{5,20,(22)}$-nor-choladienic-acid-23→17-lactone.

Example 4

355 mg. $\Delta^5$-pregnene-3β,17α-diol-20-one-17-acetate are dissolved in 5 ml. dimethyl sulfoxide and the solution then reacted under nitrogen with 60 mg. sodium amide. The mixture is stirred 5 hours at room temperature under nitrogen and the product worked up as in the above examples and chromatographed on silica gel. The yield is 43% 3β,17α - dihydroxy - $\Delta^{5,20,(22)}$-nor-choladienic-acid-23→17-lactone.

Example 5

355 mg. $\Delta^5$-pregnene-3β,17α-diol-20-one-17-acetate are dissolved in 5 ml. dimethyl sulfoxide and the solution then reacted under nitrogen with 80 mg. sodium methylate. The mixture is then stirred 5 hours under nitrogen at room temperature and after precipitation in water is worked up as above. The yield is 81% crude 3β,17α-dihydroxy-$\Delta^{5,20,(22)}$-nor-choladienic-acid-23→17-lactone.

Example 6

The reaction is performed as in Example 5, but with 30 mg. sodium instead of sodium methylate as condensation agent. After 5 hours the product is prepared as in Example 5 and is chromatographed on silica gel. The yield is 33% 3β,17α-dihydroxy-$\Delta^{5,20,(22)}$-nor-choladienic-acid-23→17-lactone.

Example 7

390 mg. $\Delta^5$-pregnene-3β,17α-diol-20-one-17-propionate (produced from $\Delta^5$-pregnene-3β,17α-diol-20-one-3-acetate by esterification with propionic acid/propionic anhydride/p-toluene-sulfonic acid, and partial saponification with methanolic HCl, M.P. 226–228° C.) are dissolved in 5 ml. dimethylsulfoxide and then reacted under nitrogen with 32 mg. sodium hydride. The mixture is stirred under nitrogen and after 15 minutes 1 ml. dimethyl sulfoxide is added and the mixture is stirred 5 hours at room temperature under nitrogen. The product is precipitated in water acidified with acetic acid, producing 360 mg. crude 3β,17α-dihydroxy - 22 - methyl-$\Delta^{5,20,(22)}$-nor-choladienic-acid-23→17-lactone. M.P. 215–228° C. After crystallization from ethyl acetate the yield is 170 mg. M.P. 237.5–239° C.

Example 8

400 mg. 3-enol-ethyl-ether of $\Delta^4$-pregnene-17β-ol-3,20-dione-17-acetate are dissolved in 7 ml. dimethyl sulfoxide and the solution is then reacted under nitrogen with 26.4 mg. sodium hydride. The solution is stirred 5 hours at room temperature under nitrogen to produce the intermediate product 3 - ethoxy - 17β-hydroxy-$\Delta^{3,5,20,(22)}$-nor-cholatrienic-acid-23→17-lactone. (This 3-alkyl-ether can also be isolated in the usual manner. M.P. 184–186° C.) The product is reacted with 10 ml. dilute methanolic hydrochloric acid, stirred 1 hour, poured into water and extracted with methylene chloride. The organic phases are washed with water and dried under vacuum. The residue is washed with hexane and diisopropyl-ether and recrystallized from ethyl acetate. The yield is 150 mg. 17β - hydroxy - 3 - keto - $\Delta^{4,20,(22)}$-nor-choladienic-acid-23→17-lactone with a M.P. 205 to 206° C. and with the formula

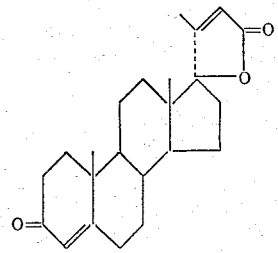

Example 9

4.05 g. α - benzoyl-α-phenyl-ethyl-acetate (produced from benzyl with methyl-magnesium-iodide and acetylation, M.P. 72.5–73° C.) are dissolved in 37.5 ml. dimethyl sulfoxide, the solution then reacted under nitrogen with 0.42 g. sodium hydride, stirred overnight under nitrogen at room temperature, poured into water acidified with acetic acid, and extracted with methylene chloride. The organic phase is washed with water, dried, and the solvent removed in vacuum. The residue is subjected to vacuum fractionation. The yield is 3 g. D,L-γ-methyl-β,γ-diphenyl-α-butenolide. B.P.$_{0.9\text{ mm. Hg}}$ 175° C.

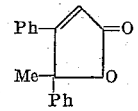

Example 10

4.6 g. 1-acetoxy-1-acetyl-cyclohexane (B.P.$_{1.2\text{ mm. Hg}}$ 75–76° C.) are dissolved in 50 ml. dimethyl sulfoxide, the solution reacted under nitrogen with 0.66 g. sodium hydride, stirred overnight under nitrogen at room temperature, poured into ice water acidified with acetic acid, and extracted with methylene chloride. The product is washed with a little water, dried, evaporated to dryness and recrystallized from hexane. The yield is 1.7 g. β[1'-hydroxy - cyclohexyl-(1')]-cis-crotonyl-lactone. M.P. 45–47° C. For analysis it is recrystallized from hexane. M.P. 49.5–51° C. The lactone can also be recrystallized from water.

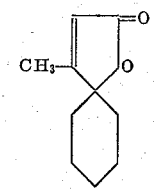

Example 11

6.7 g. 1-propionyloxy-1-acetyl-cyclohexane (produced from 1-acetyl-cyclohexane-1-ol by esterification with a mixture of propionic acid, propionic anhydride and p-toluene-sulfonic acid B.P.$_{15}$ 127° C.) are dissolved in 65 ml. dimethyl sulfoxide and the solution then reacted under nitrogen with 0.89 g. sodium hydride. The product is separated as in Example 10. After recrystallization from hexane the yield is 1.42 g. α-methyl-β-[1'-hydroxy-cyclohexyl-(1')]-cretonyl-lactone. M.P. 65–66° C.

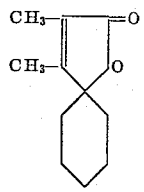

Example 12

2.64 g. acetoxy-benzoyl-diphenyl-methane (produced from benzyl with phenyl-magnesium-bromide and acetylation; M.P. 142–143° C.) are stirred under nitrogen in 20 ml. dimethyl sulfoxide with 0.42 g. 50% sodium hydride suspended in oil 5 hours at room temperature and then poured into ice water acidified with acetic acid. The resulting precipitate is filtered off, washed to neutrality, and dried. The crude product (1.8 g.) is recrystallized from ethyl acetate. The yield is 0.66 g. β,γ,γ-triphenyl-α-butenolide. M.P. 195.5° to 196° C.

Example 13

3.6 g. 21-desoxyprednisolone-11,17-diacetate (M.P. 221–223° C.; produced from the free 21-desoxyprednisolone by esterification with glacial acetic acid and acetic anhydride and p-toluene-sulfonic acid) are dissolved in 85 ml. dimethyl sulfoxide and stirred 5 hours at room temperature with 505 mg. of a 50% sodium hydride suspension in oil. The solution is then poured into ice water acidified with acetic acid and the resulting precipitate filtered off, washed with water, and dried, yielding 3.2 g. crude product.

This crude product is reacted in 15 ml. methanol with 0.15 ml. water and 0.01 ml. conc. hydrochloric acid by heating 5 minutes under reflux. The mixture is then diluted with ether, extracted, washed with water and bicarbonate solution, dried, and the solvent evaporated to dryness. After recrystallization from ethyl acetate and acetone the yield is 1.2 g. 11β,17α-dihydroxy-3-oxo-Δ$^{1,4,20,(22)}$-norcholatrienic acid-23→17-lactone. M.P. 250.5 to 252° C. $\epsilon_{227}$=19,720.

Example 14

100 mg. Δ$^5$-pregnene-3β,17α-diol-20-one-17-acetate powder are stirred with 1 mg. sodium hydroxide powder in 1.5 ml. dimethyl sulfoxide under nitrogen. After about 7 minutes the substance goes into solution. It is then immediately poured into ice water acidified with acetic acid, filtered off, washed with water, and dried. The yield is 96 mg. crude 3β,17α,20-trihydroxy-Δ$^5$-nor-cholenic-acid-23→17-lactone. After recrystallization from ethyl acetate/methanol the product has a M.P. of 287 to 288° C.

Example 15

The method is followed as in Example 14, but 1 mg. sodium hydride is used instead of the sodium hydroxide. After about 7 minutes the mixture is poured into water to precipitate the crude product (95 mg.) from which an 85% yield of 3β,17α-20-trihydroxy-Δ$^5$-nor-cholenic-acid-23→17-lactone is isolated. M.P. 287 to 288° C.

There is obtanied as a by-product a 15% yield of 3β,17α-dihydroxy-Δ$^{5,20,(22)}$-nor-choladienic-acid-23→17-lactone. M.P. 257 to 259° C.

Example 16

375 mg. Δ$^1$-5α-pregnene-17α-ol-3,20-dione-acetate powder are stirred with 3 mg. sodium hydroxide powder in 5 ml. dimethyl sulfoxide under nitrogen. The substance goes into solution after about 8 minutes. The mixture is immediately poured into ice water acidified with acetic acid, filtered, washed with water, and dried. The yield is 360 mg. crude 17α-20-dihydroxy-3-oxo-Δ$^1$-5α-nor-cholenic acid-23→17-lactone. M.P. 258 to 266° C. After recrystallization from ethyl acetate/methanol the hydroxy-lactone melts at 266–267° C.

Example 17

330 mg. finely pulverized acetoxy-benzoyl-diphenyl-methane (prepared as in Example 12) and 40 mg. powdered sodium hydroxide are stirred in 5 ml. dimethylsulfoxide during 10 minutes at room temperature under nitrogen. The mixture is poured into ice water, extracted with ether and the extract then washed with water, dried, and evaporated to dryness under vacuum. The residue is recrystallized from methylene chloride/hexane and thereafter from diisopropyl ether, yielding D,L,β-hydroxy-β,γ,γ-triphenyl-butanolide. M.P. 154–155° C.

From the foregoing description one skilled in the art can easily ascertain the essential characteristics of this invention, and without departing from the spirit and scope thereof, can make various changes and modifications of the invention to adapt it to various usages and conditions. Consequently, such changes and modifications are properly equitable, and intended to be, within the full range of equivalence of the following claims.

What is claimed is:

1. A compound selected from the group consisting of

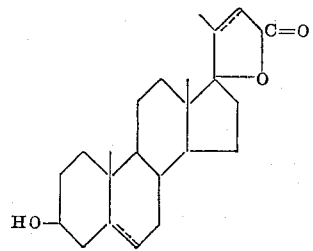

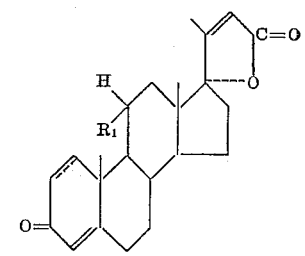

and

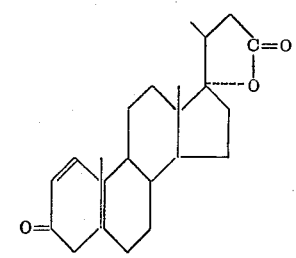

wherein R$_1$ is selected from the group consisting of hydrogen, hydroxyl and acetoxy, and the dotted line indicates that positions C–1(2), C–5(6) and C–20(22) may be saturated or unsaturated.

2. 3β,17α-dihydroxy-Δ$^{5,20,(22)}$-nor-choladienic-acid-23→17-lactone.

3. 17α-hydroxy-3-oxo-Δ$^{20,(22)}$-5α-nor-cholenic-acid-23→17-lactone.

4. 17β - hydroxy - 3 - keto - $\Delta^{4,20,(22)}$ - nor - choladienic-acid-23→17-lactone.

5. D,L - γ - methyl - β,γ - diphenyl - α - butenolide.

6. β - [1' - hydroxy - cyclohexyl - (1')] - cis - crotonyl-lactone.

7. α - methyl - β - [1' - hydroxy - cyclohexyl - (1')] - cis-crotonyl-lactone.

8. β,γ,γ-triphenyl-α-butenolide.

9. 3β,17α,20 - trihydroxy - $\Delta^5$ - nor - cholenic - acid-23→17-lactone.

10. 17α,20 - dihydroxy - 3 - oxo - $\Delta^1$ - 5α - nor - cholenic-acid-23→17-lactone.

11. 11β,17α - dihydroxy - 3 - oxo - $\Delta^{1,4,20,(22)}$ - nor-cholatrienic-acid-23→17-lactone.

12. 3 - ethoxy - 17β - hydroxy - $\Delta^{3,5,20,(22)}$ - nor - cholatrienic-acid-23→17-lactone.

13. 3β,17α - dihydroxy - 22 - methyl - $\Delta^{5,20,(22)}$ - nor-choladienic-acid-23→17-lactone.

14. D,L - β - hydroxy - β,γ,γ - triphenyl - butanolide.

15. A process for the production of the compounds of claim 1 comprising reacting a 17-acyloxy-20 keto-derivative of the pregnane series with proton acceptors selected from the group consisting of metal hydrides, alkali metal amides, alkali metal alcoholates, alkali metal hydroxides, alkaline earth metal hydroxides and sodium in a water-free dipolar aprotic solvent.

16. The process of claim 15, wherein said aprotic solvent is dimethyl sulfoxide.

17. The process of claim 15, wherein said aprotic solvent is dimethyl formamide.

18. The process of claim 15, wherein said strong proton acceptor is sodium hydroxide.

No references cited.

ELBERT L. ROBERTS, *Primary Examiner.*

UNITED STATES PATENT OFFICE
CERTIFICATE OF CORRECTION

Patent No. 3,331,837                            July 18, 1967

Hans-Günter Lehmann

It is hereby certified that error appears in the above numbered patent requiring correction and that the said Letters Patent should read as corrected below.

Column 4, line 40, and column 5, line 24, for "benzyl", each occurrence, read -- benzil --; column 5, line 10, for "-cretonyl-" read -- -crotonyl---; column 6, lines 57 to 67, the lower left-hand portion of the formula should appear as shown below instead of as in the patent:

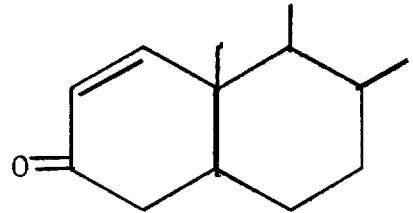

Signed and sealed this 20th day of August 1968.

(SEAL)
Attest:

EDWARD M. FLETCHER, JR.                     EDWARD J. BRENNER
Attesting Officer                                Commissioner of Patents